(No Model.)

J. ADLER.
GAME APPARATUS.

No. 593,731.  Patented Nov. 16, 1897.

WITNESSES:

INVENTOR
Joshua Adler
BY
ATTORNEYS.

THE NORRIS PETERS CO., PHOTO-LITHO., WASHINGTON, D. C.

UNITED STATES PATENT OFFICE.

JOSUA ADLER, OF SALEM, OREGON.

GAME APPARATUS.

SPECIFICATION forming part of Letters Patent No. 593,731, dated November 16, 1897.

Application filed January 30, 1897. Serial No. 621,307. (No model.)

*To all whom it may concern:*

Be it known that I, JOSUA ADLER, of Salem, in the county of Marion and State of Oregon, have invented a new and Improved Game Apparatus, of which the following is a full, clear, and exact description.

The object of the invention is to provide an improved game apparatus arranged more especially for teaching the rudiments of music, at the same time affording considerable amusement to the players, without, however, requiring a knowledge of music on the part of the players.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the views.

Figure 1:
Figure 2:
Figure 3:
Figure 4:
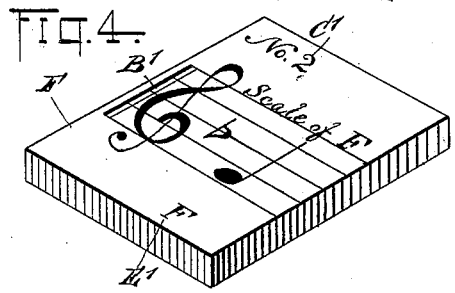
Figure 5:
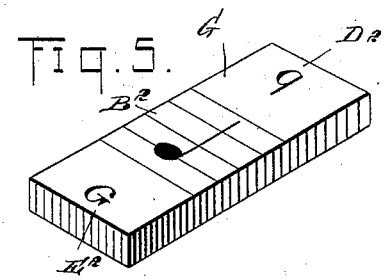
Figure 6:
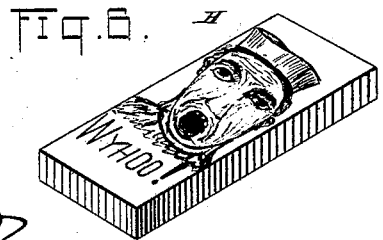

Figures 1, 2, and 3 are face views of some of the cards. Fig. 4 is a perspective view of one of the beginning blocks. Fig. 5 is a like view of one of the hand-blocks, and Fig. 6 is a perspective view of one of the "Wyhoo" blocks.

The improved game apparatus is provided with a series of cards A, A', and A², preferably twelve in number, and made of cardboard, celluloid, or other suitable material. On each of the cards A is printed or is otherwise formed thereon a musical scale B, having the usual lines, notes, the treble signature 𝄞, or the bass signature 𝄢. The several cards are further provided with a number C, and the several notes, except the first one, are indicated by numerals D, preferably arranged at the upper part of the card, as plainly indicated in Figs. 1, 2, and 3. The names E of the notes of the scale are written on the lower part of the card, so as to readily identify the notes of the scale.

The game apparatus is further provided with a set of blocks F, made of wood or other suitable material and containing the beginning of a scale B'—that is, part of the lines, the first note, and the treble or bass signature. Each block F is provided with a numeral C', corresponding to one of the numerals C on the cards, and with the names E' of the notes of the scale. A second set of blocks G is provided containing a portion B² of the lines of the scale, a single note, a numeral D, corresponding to a numeral D on the corresponding card A, A', or A², and on the lower end of each block G is given the name E² of the note on the block.

In addition to the blocks F and G, I provide a few blocks H, which I prefer to call "Wyhoo" blocks, having the representation of a human being apparently disgusted with himself and the world at large. (See Fig. 6.) The blocks F, G, and H are of a height corresponding to the width of the cards A, A', and A² and are arranged so that each block F, when placed directly above or below the beginning of the card, produces a facsimile of said beginning of the card—that is, including the treble or bass signature and the face note—while the blocks G are intended to produce a facsimile of a single note on a card. When the game is finished, the corresponding block F for a certain card, together with the proper blocks G, reproduce and represent the same scale as indicated by the card.

The game is played as follows: All the blocks F, G, and H are placed on a table with the face down, and then the blocks are mixed before the players draw the same. Each player draws one of the large blocks F and selects the card A A' A² bearing the corresponding number, (C C'.) Both card and block are placed in front of the player, with the face up and with the block F either above or below the beginning of the card. Each of the players now draws a predetermined number of blocks G from the ones on the table and sets the same up in front of the player, the blocks being called the "hand" of the player. From two to five players usually take five blocks each, six to eight players four blocks, and nine to twelve players three blocks. If a "Wyhoo" block H is drawn with the "hand," it is returned to the table and another block G is drawn in place of it. The remaining blocks G are left on the table and will be known as the "reserve," and the remaining large blocks F, if any are left, are returned to the box or removed from the table. The "hands" are placed face up, and then the game proceeds as follows: The player holding the highest-numbered card begins to play by trying to build the scale in rotation, according to the numerals D on the card, beginning at the left, next to the block F. The player first uses, as far as possible, the blocks G from his own "hand" and then calls out the number of the next block needed, as indicated by his card, and this block must be given up from the "hand" of the first player to the left holding the block. The block thus obtained from one of the other players is added to the scale, and the player again builds from the "hand," if possible. Only one call is permitted in a play. If the block called for is not held in the hand by any one of the players, a "draw" is allowed from the "reserve," and if the block drawn is not the one needed it is added to the player's "hand." If the desired block is drawn, it is added to the scale, and the playing continues from the "hand" as far as possible. Only one "draw" is permitted by a player during his turn. The drawing of a "Wyhoo" block H compels the player to accept a block G from each of the other players' "hands." In the event of a player not having any blocks left in hand a "draw" must be made from the "reserve" for that purpose. The "Wyhoo" block H drawn is then returned to the "reserve," which should then be shuffled. The player failing to give up a block G from his "hand" when called for is compelled to receive a block from each of the other players, the same as if a "Wyhoo" block H has been drawn. The building of the scale according to numerals on card A, A', and A² with blocks G is continued always to the left until two scales are completed. The player completing the first scale continues to respond to all calls and continues to draw in turn, and is subject to all the rules, as heretofore. The completion of the second scale finishes the game, which is decided in favor of the player who completed the scale with the least number of blocks left in the "hand."

In the event of a tie the game is decided in favor of the lowest-numbered card A A' of the two completed scales. The winning scale should be called off by giving the name of the scale and the names of the notes. The game may be played by calling out names of notes from the beginning instead of numerals D, if desired.

It will be seen that by the arrangement described the players unconsciously receive a musical education.

Having thus fully described my invention, what I claim as new, and desire to secure by Letters Patent, is—

1. A game apparatus comprising a series of cards having formed thereon different musical scales, each card being provided with a number and with numerals indicating the notes of the scale, and sets of blocks to be placed above or below said cards, one set having the beginning of the scale and a number corresponding to the number of one of the cards; the other set of blocks having a portion of the scale with a single note and a numeral corresponding to one of the numerals on the card, substantially as shown and described.

2. A game apparatus comprising a series of cards having formed thereon different musical scales, each card being provided with a number and with numerals indicating the notes of the scale, and sets of blocks to be placed above or below said cards, one set having the beginning of the scale and a number corresponding to the number of one of the cards; the other set of blocks having a portion of the scale with a single note and a numeral corresponding to one of the numerals on the card, and an extra set of "Wyhoo" blocks, substantially as shown and described.

3. A game apparatus, comprising a game of cards having thereon different musical scales, each card being provided with an identifying-character and with a numeral above each note of the scale except the first or key note, each note being identified by its numeral, and sets of blocks to be placed above or below said cards, one set of such blocks containing a character corresponding to the identifying-character of one of the cards, the signature of the scale on such card, and the first note of such scale, and the other set of blocks containing a single note and its corresponding numeral, as set forth.

JOSUA ADLER.

Witnesses:
C. F. BROWN,
A. A. HUNGERFORD.